US007789608B2

(12) United States Patent
Hill et al.

(10) Patent No.: US 7,789,608 B2
(45) Date of Patent: Sep. 7, 2010

(54) LAMINATED NUT WITH TENSION INDICATOR

(75) Inventors: Ross S. Hill, Lansing, MI (US); Lawrence W. Johnson, Taylor, MI (US)

(73) Assignee: Illinois Tool Works Inc., Glenview, IL (US)

( * ) Notice: Subject to any disclaimer, the term of this patent is extended or adjusted under 35 U.S.C. 154(b) by 877 days.

(21) Appl. No.: 11/706,819

(22) Filed: Feb. 13, 2007

(65) Prior Publication Data

US 2008/0193249 A1    Aug. 14, 2008

(51) Int. Cl.
*F16B 37/08* (2006.01)
*F16B 39/12* (2006.01)

(52) U.S. Cl. .................................. 411/432; 411/222

(58) Field of Classification Search ............. 411/432, 411/112, 182, 533, 108, 431, 433, 970, 173, 411/177, 183, 368–369, 937.2, 222, 375, 411/290–291
See application file for complete search history.

(56) References Cited

U.S. PATENT DOCUMENTS 2,581,641 A * 1/1952 Forgaard ................. 411/259
3,921,686 A * 11/1975 Markey .................. 411/167
4,383,787 A *  5/1983 Reynolds ................. 411/221
4,900,209 A *  2/1990 Reynolds ................. 411/432
4,930,962 A    6/1990 Reynolds
4,940,377 A    7/1990 Reynolds
4,984,319 A *  1/1991 Reynolds ................. 470/19
5,017,079 A *  5/1991 Reynolds ................. 411/432
5,049,017 A *  9/1991 Reynolds ................. 411/432
5,700,121 A * 12/1997 Minola ................... 411/432
6,015,253 A *  1/2000 Mitts .................... 411/432
2008/0193259 A1* 8/2008 Hill ...................... 411/533
2008/0247842 A1* 10/2008 Motsch et al. ............ 411/174

* cited by examiner

*Primary Examiner*—David Reese
(74) *Attorney, Agent, or Firm*—Mark W. Croll; Paul F. Donovan

(57) ABSTRACT

A laminated nut with a visual indicator indicating if the nut is in a fully tightened state. The nut includes a plurality of conical disc springs enclosed in a cage. In one embodiment, a visual indicator extends axially from the upper surface of the outermost disc spring. In one embodiment, the visual indicator is retracted into the cage when the disc springs flatten as the nut is tightened. In one embodiment, the visual indicator aligns with a reference point on the cage when the nut is fully tightened. In one embodiment, the visual indicator is made more apparent by marking the visual indicator with a contrasting color.

19 Claims, 6 Drawing Sheets

LAMINATED NUT WITH TENSION INDICATOR

BACKGROUND OF THE INVENTION

The present invention relates to fasteners and more particularly to laminated nuts.

Laminated nuts are used as an alternative to conventional "solid" nuts in a variety of applications. Rather than a conventional solid body, laminated nuts include a number of stacked, coned disc springs that are retained together by an outer cage. The cage and disc springs collectively occupy essentially the same volume as a counterpart conventional solid nut. The interior of the disc springs are tapped so that the assembly can be threaded onto a bolt or other threaded shaft in a generally conventional manner. The cage and disc springs can be hex shaped so that the laminated nut can be installed and removed using the same tools used with conventional solid hex nuts. Examples of laminated nut structures are shown and described in U.S. Pat. No. 4,383,787, issued to Reynolds on May 17, 1983.

Unlike solid nuts, laminated nuts deform under load to grip the bolt and provide supplemental retention not provided by conventional solid nuts. In this regard, the individual disc springs have a relatively shallow cone shape and are manufactured from an elastic, resilient material. In use, conventional laminated nuts travel freely on the bolt until initial seating. Once seated, additional torque and rotation compresses and partially flattens the conical disc springs, whereby a mechanical interference occurs between the thread flanks of the nut and bolt; it is believed that this is at least partially due to a change in hole size of the nut as the conical discs flatten. The resultant thread interference and retained spring load between thread flanks resists unloading that might otherwise occur as a result of tensile or vibrational loads. Thus, the independently loaded conical spring threaded segments when flattened create a thread interference that tends to lock the nut against rotation or loosening when subject to loads.

As can be seen, the final tightening stage, which causes disc deformation, provides a locking action that helps to secure the laminated nut on the bolt. It is therefore typically desirable to ensure that the laminated nut has been sufficiently tightened to provide the desired amount of deformation and supplemental retention. It is also typically desirable to ensure that a tightened laminated nut does not back off over time and therefore lose the supplemental retention benefits associated with disc deformation.

SUMMARY OF THE INVENTION

The present invention provides a laminated nut having a visual indicator of the tightened status of the laminated nut. In one embodiment, the visual indicator moves as the disc springs of the laminated nut deform during the tightening process. In this embodiment, the visual indicator provides a visual indication of the deformation status of the laminated nut disc springs.

In one embodiment, the laminated nut includes a plurality of disc springs enclosed within a cage. In this embodiment, the visual indicator may be an annular ring extending from the upper surface of the outermost disc. The annular ring may be configured to protrude at least partially from the cage when the discs are in a relaxed, cone-shaped condition and to be withdrawn into the cage when the disc springs are in a properly tightened, partially flattened condition. In use, the annular ring moves as the laminated nut is tightened.

In one embodiment, the axial ring may extend the entire span of the inner circumferential edge on the upper surface of the outermost disc. The axial ring may be of a specific height so as to protrude from the cage when the nut is in an untightened state and to be level with a reference point on the cage when the nut is properly tightened. In one embodiment, the reference point may be the top surface of the cage.

In one embodiment, at least a portion of the visual indicator is a contrasting or otherwise highly visible color that enhances the visibility of the indicator. In one embodiment, the top of the visual indicator is white.

The present invention provides a simple and effective laminated nut construction with a convenient visual indicator. The visual indicator is easily incorporated into the laminated nut construction without significant additional cost. The visual indicator operates automatically as the laminated nut is tightened and loosened and therefore does not require any additional effort on the part of the user. The visual indicator enables an observer to easily and expediently determine whether a laminated nut has been or remains fully tightened.

These and other objects, advantages, and features of the invention will be readily understood and appreciated by reference to the detailed description of the current embodiment and the drawings.

DESCRIPTION OF THE CURRENT EMBODIMENT

Figure 1:
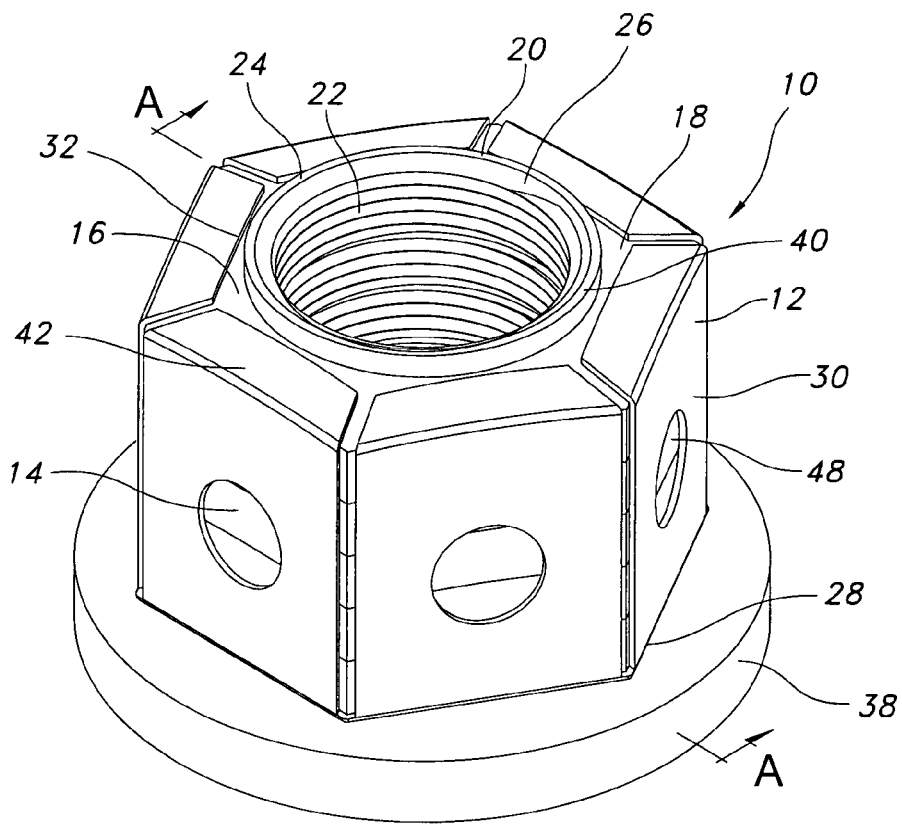
FIG. 1 is a perspective view of an embodiment of a laminated nut in an untightened state.
Figure 2:
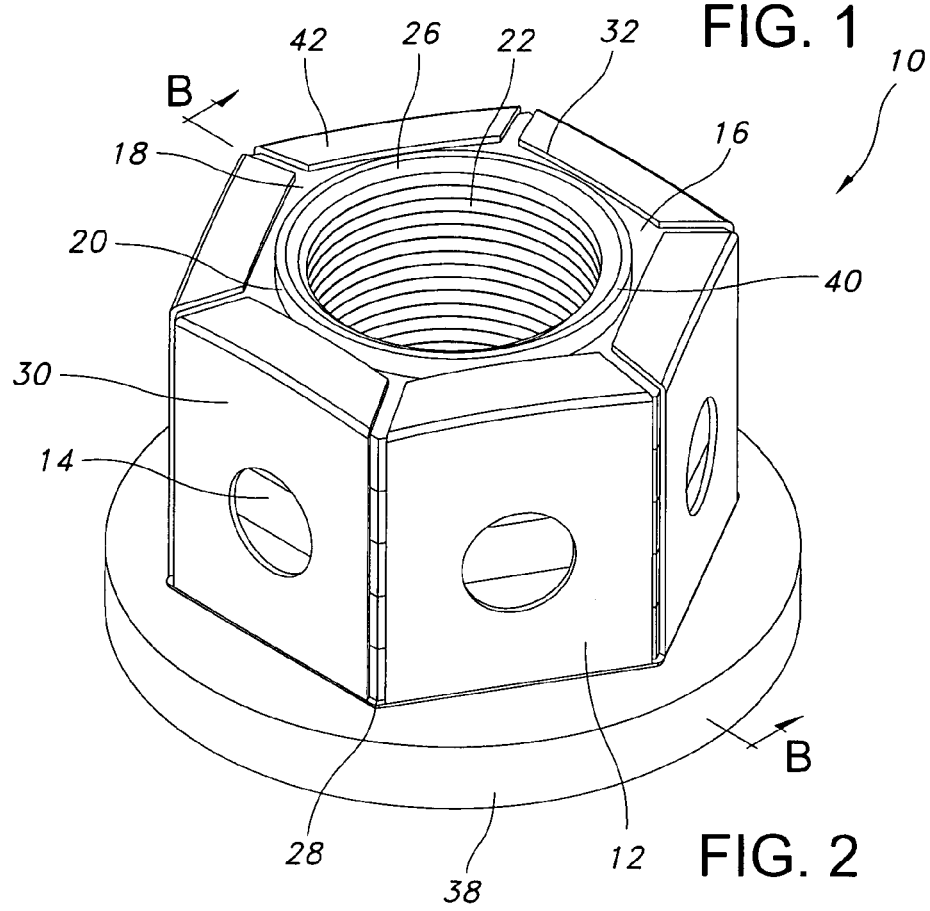
FIG. 2 is a perspective view of the laminated nut of FIG. 1 in a tightened state.
Figure 3:
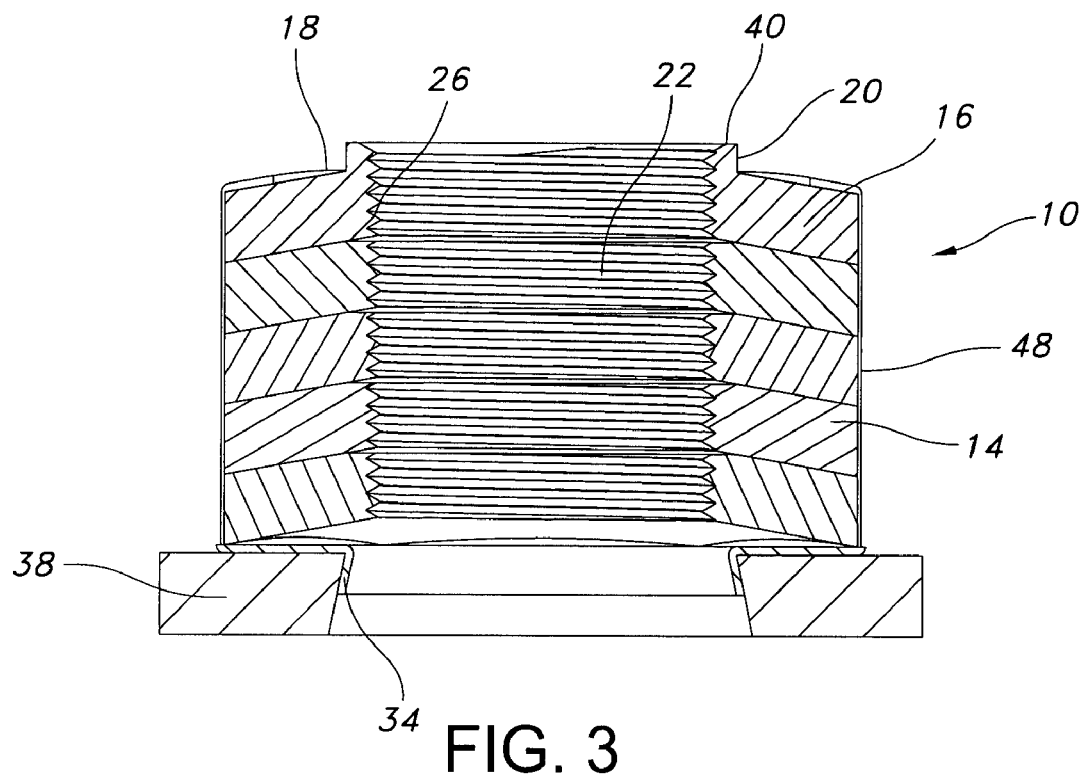
FIG. 3 is a cross-section of the laminated nut of FIG. 1 taken along line A-A of FIG. 1.
Figure 4:
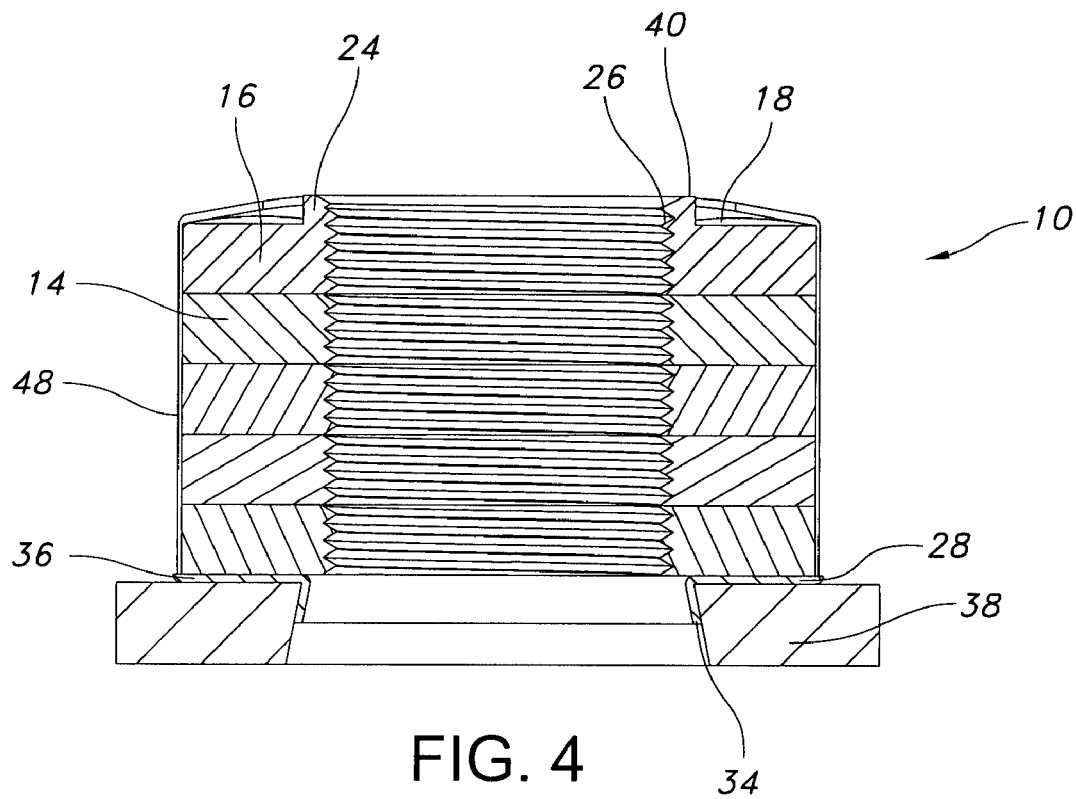
FIG. 4 is a cross-section of the laminated nut of FIG. 1 taken along line B-B of FIG. 2.
Figure 5:
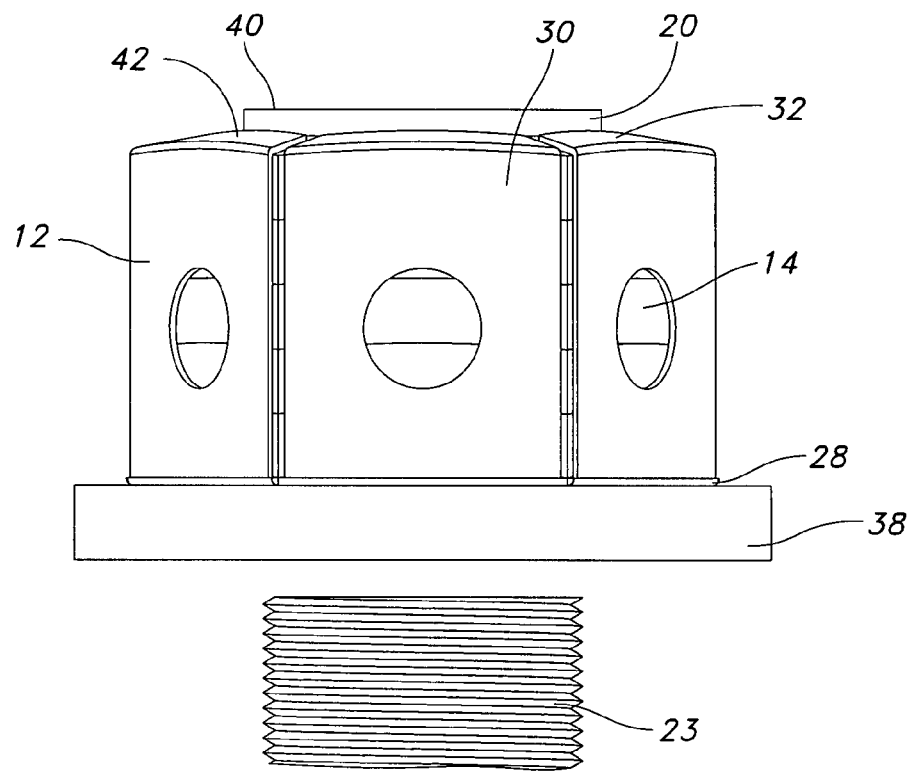
FIG. 5 is a front view of the laminated nut of FIG. 1 prior to engaging a bolt.
Figure 6:
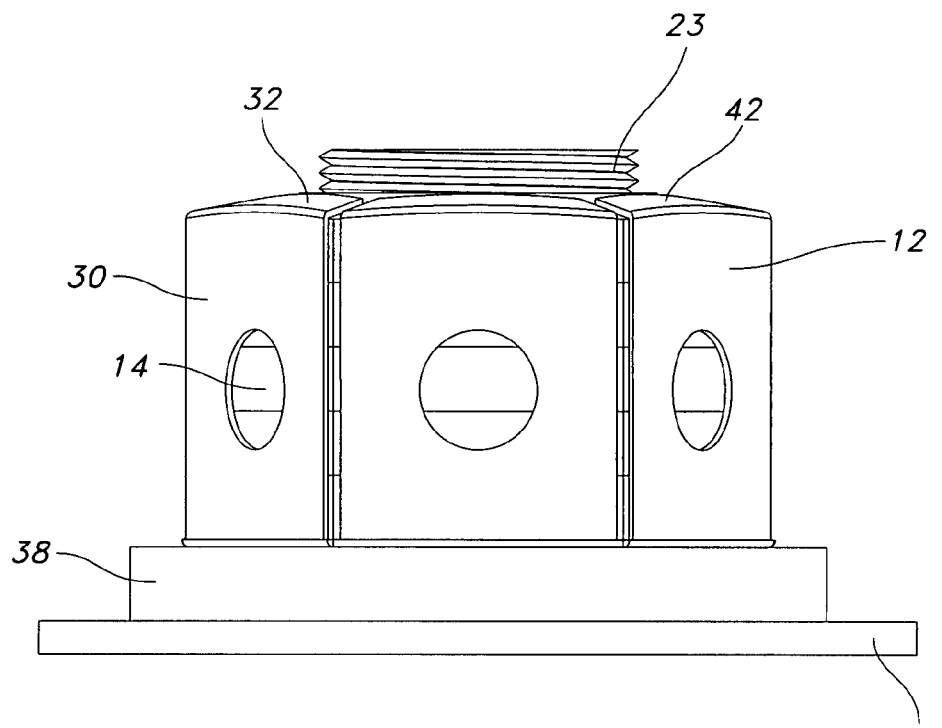
FIG. 6 is a front view of the laminated nut of FIG. 1 engaged with a bolt and fully tightened against a workpiece.

A laminated nut in accordance with an embodiment of the present invention is shown in the figures and generally designated 10. The laminated nut 10 generally includes a cage 12 and a plurality of disc springs 14. The disc springs 14 are stacked and held relative to each other by the cage 12. The outermost spring 16 has an upper surface 18 with a visual indicator 20 projecting therefrom.

Figure 7:
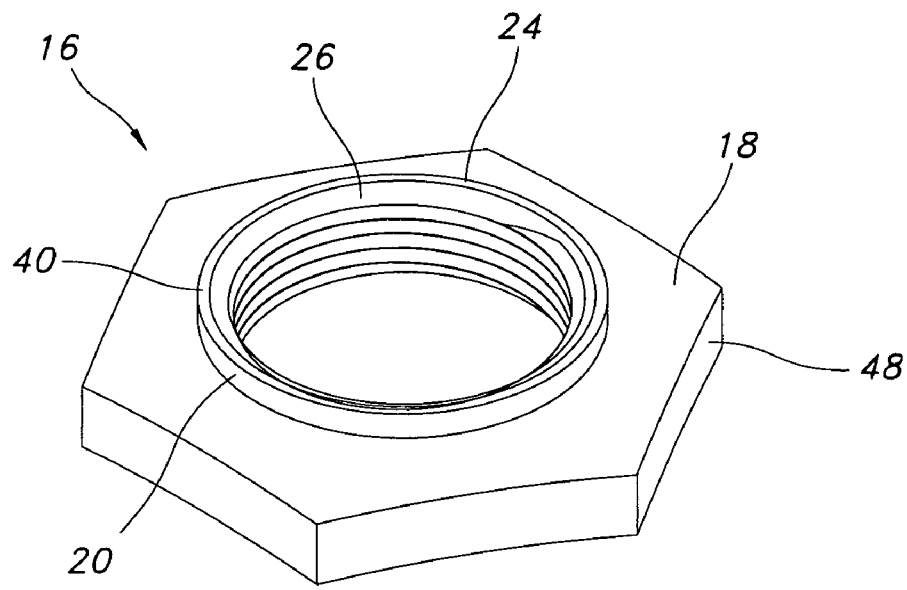
FIG. 7 is a perspective view of an outermost disc spring of the type utilized in the laminated nut of FIG. 1.

An embodiment of the current invention constructed generally in accordance with U.S. Pat. No. 4,900,209, issued to Reynolds on Feb. 13, 1990, is shown in FIGS. 1-6 and designated generally 10. U.S. Pat. No. 4,900,209 is incorporated herein by reference. The laminated nut 10 of FIG. 1 generally includes a cage 12, a plurality of disc springs 14 and a base washer 38. The disc springs 14 are stacked and enclosed within the cage 12. Each disc spring 14 defines a central bore 22. The central bores 22 of the disc springs 14 are in alignment with one another and are internally threaded. As a result, the central bores 22 cooperatively define a threaded throughbore that permits the laminated nut 10 to receive a threaded rod, such as a bolt 23, in essentially the same manner as a conventional solid nut. In one embodiment, the disc springs 14 are hexagonally shaped, but the springs may be shaped otherwise in alternative embodiments. The disc springs 14 have a somewhat truncated cone-shaped and are manufactured from elastically deformable material. The outermost disc spring 16 has upper surface 18 and defines an inner circumferential edge 26. A visual indicator 20 projects axially from the upper surface 18 of the disc spring 16 around the inner circumferential edge 26. In one embodiment illustrated in FIG. 7, the visual indicator 20 forms an annular ridge 24 completely encircling the inner circumferential edge 26. In other embodiments illustrated in FIGS. 8 and 11, the visual indicator 20 is discontinuous over the course of the inner circumferential edge 26. The specific geometry of the visual indicator 20 including the height, number of segments, and length of segments can be adjusted to accommodate various types of laminated nuts 10. (See e.g., FIGS. 8-10). The visual indicator 20 also may be marked in a highly visible color or material to make it more apparent to those observing the nut 10. The entire visual indicator 20 may be marked or only a portion of the visual indicator 20 may be marked, for example, only the top 40 (e.g. the axial end) of the visual indicator 20 may be marked. In one embodiment, the visual indicator 20 is marked white. In alternative embodiments, the visual indicator 20 could be marked with a bright color or reflective material.

In one embodiment, the cage 12 surrounds the plurality of disc springs 14. The cage 12 has a base 28 and a plurality of fingers 30 extending from the base 28. The fingers 30 project up around the plurality of disc springs 14 with the ends 32 of the fingers 30 folding over onto the upper surface 18 of the outermost spring 16. The cage 12 holds the disc springs 14 together in a stacked configuration and prevents them from rotating relative to each other. In the illustrated embodiment, the laminated nut 10 includes an integrated base washer 38. The integrated washer 38 is optional and may be eliminated if desired. To accommodate the base washer 38, the cage 12 includes a washer ridge 34 extending from the bottom surface 36 of the base 28 of the cage 12. In the illustrated embodiment, the base washer 38 defines a washer hole 39. The washer ridge 34 of the cage 12 is interfitted with the washer hole 39 to forcibly retain the base washer 38 on the cage 12. In another embodiment, washer ridge 34 is discontinuous to allow for metal expansion without creating cracks.

The height of the visual indicator 20 is variable and can be adjusted to accommodate various laminated nut 10 configurations. Typically, the height of the visual indicator 20 is selected such that the proper tightening of the nut is indicated by the visual indicator's 20 position relative to some reference point on the cage 12. In one embodiment, the height of the visual indicator 20 is chosen to coincide with the distance the outermost disc spring 16 compresses when the nut 10 is properly tightened. In this embodiment, the reference point is the top surface 42 of the fingers 30 of the cage 12. As a result, when the nut 10 is properly tightened, the top 40 of the visual indicator 20 will be level with or slightly below the top surface 42 of the fingers 30. Thus, if an observer detects that the top 40 of the visual indicator 20 has protruded beyond the top surface 42 of the fingers 30, the observer will expediently and efficiently detect that the nut 10 is no longer properly tightened.

To operate one embodiment of the laminated nut 10, the laminated nut 10 is mounted on a threaded rod such as a bolt 23. In this initial untightened position, the disc springs 14 are in an undeformed condition and are still somewhat conical. The visual indicator 20 extends up and out of the cage 12 past the ends 32 of the fingers 30 of the cage. The laminated nut 10 is free running on the bolt 23 until the nut 10 is seated against the workpiece 39. Additional tightening beyond this point generates a locking force on the disc springs 14. This locking force compresses and partially flattens the disc springs 14. As the outermost disc spring 14 is compressed, the visual indicator 20 is retracted down towards the base 28 of the cage 12. When the top 40 of the visual indicator 20 is level with (or slightly below) the top surface 42 of the ends 32 of the fingers 30 of the cage 12 the nut is fully tightened.

Figure 8:
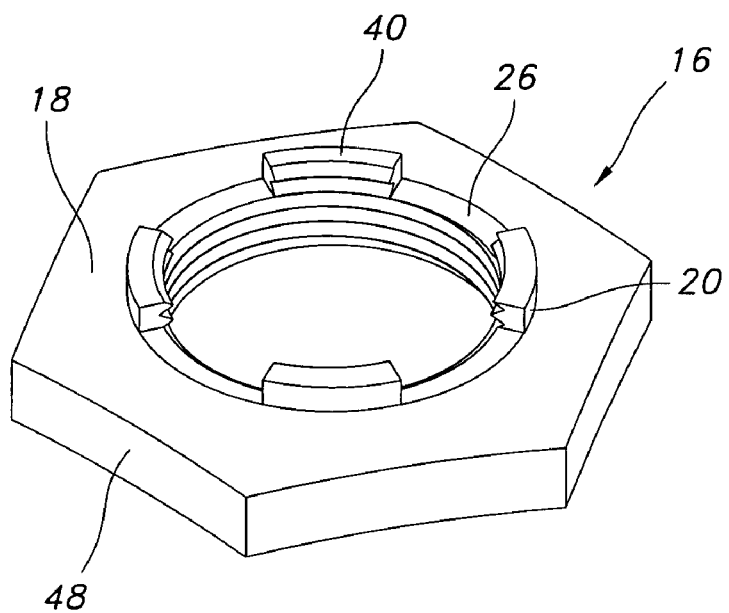
FIG. 8 is a perspective view of an alternative embodiment of an outermost disc spring having a visual indicator that is discontinuous over the inner circumferential edge of the disc.
Figure 9:
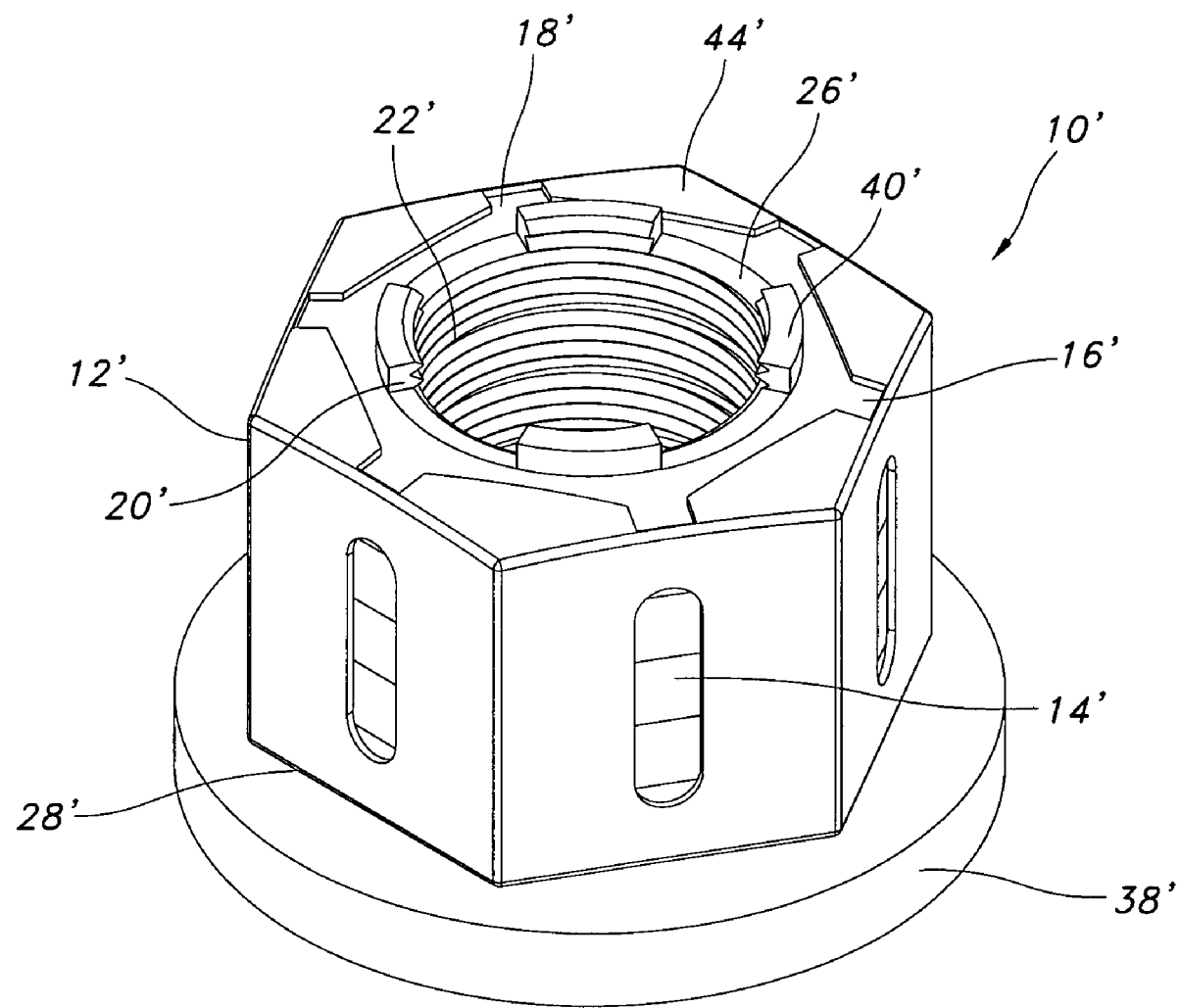
FIG. 9 is a perspective view of an alternative embodiment of a laminated nut including a cage having a unitary tube construction.

An alternative embodiment of the current invention constructed generally in accordance with U.S. Pat. No. 6,015,253, issued to Mitts on Jan. 18, 2000, is shown in FIGS. 8 and 9 and designated generally 10'. U.S. Pat. No. 6,015,253 is incorporated herein by reference. This embodiment utilizes a cage 12' fabricated from a flat metal blank that is converted by a progressive die or some other forming method into a unitary elongated tube. The plurality of disc springs 14' are received into the cage 12', and the tabs 44' of the cage 12' are folded over to retain the discs 14'.

Figure 10:
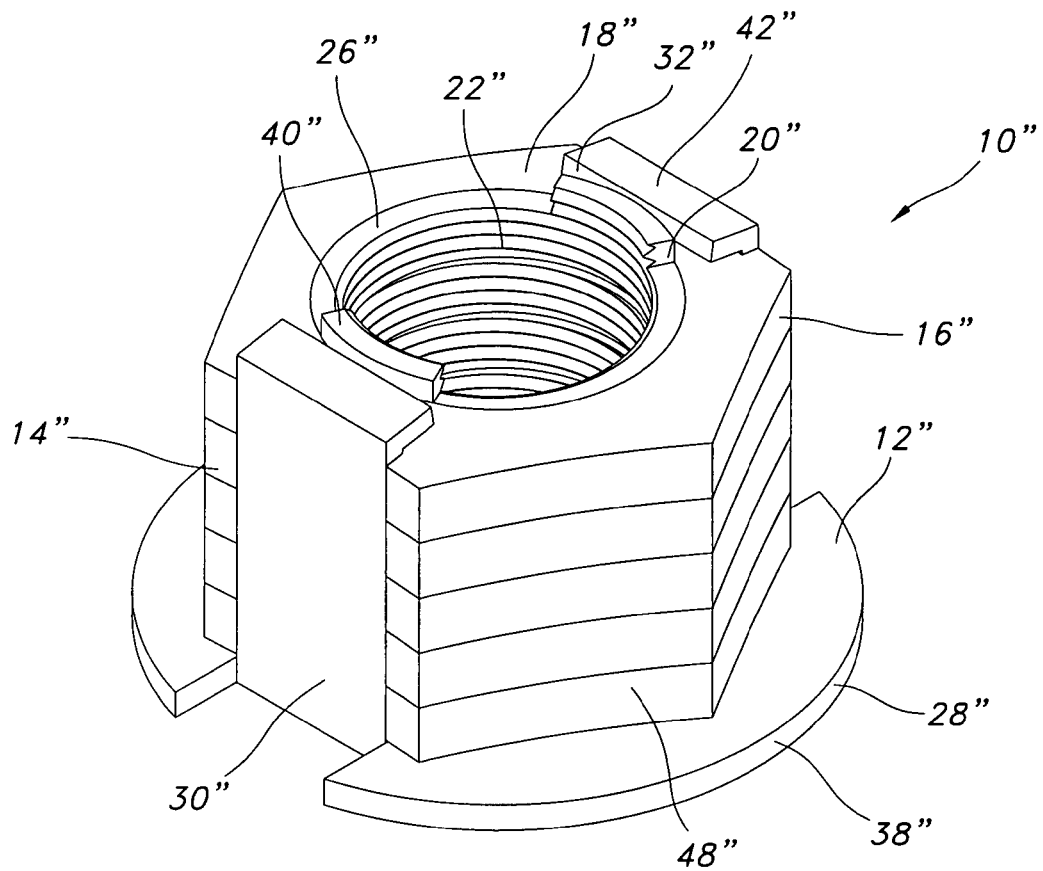
FIG. 10 is a perspective view of an alternative embodiment of a laminated nut including a cage incorporating the base washer into the cage.

In this embodiment, the tabs 44' of the cage 12' are used as the reference point for the visual indicator 20'. When the nut 10' is not fully tightened, the visual indicator 20' protrudes from the cage 12' beyond the tabs 44' as can be seen in FIG. 9. This embodiment also utilizes a visual indicator 20' that is discontinuous over several sections of the inner circumferential edge 26' of the upper surface 18' of the outermost disc spring 16'. FIG. 10 illustrates such a disc spring 16'. When the nut 10' is tightened, the disc springs 14' flatten slightly, and the visual indicator 20' will be level with the tabs 44' of the cage 12'. Should an observer notice after installation that the visual indicator 20' was again extending beyond the tabs 44' the observer would quickly detect that the nut 10' was no longer in a fully tightened state.

Figure 11:
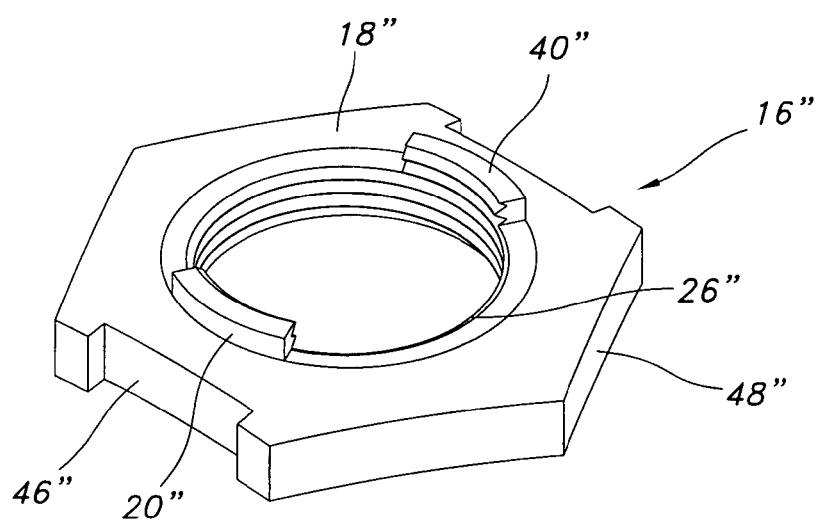
FIG. 11 is a perspective view of an outermost disc spring of the type utilized in the laminated nut of FIG. 10.

A further embodiment of the current invention constructed generally in accordance with U.S. Pat. No. 4,940,377, issued to Reynolds on Jul. 10, 1990, is shown in FIGS. 10 and 11 and designated generally 10". U.S. Pat. No. 4,940,377 is incorporated herein by reference. This embodiment utilizes a cage 12" whose base 28" also serves as the base washer 38" for the nut 10". The base 28" of the cage 12" extends out beyond the perimeter of the disc springs 14" distributing the load of the disc springs 14" over a wider area of the workpiece. However, in another embodiment, the cage 12" could incorporate a separate base washer 38" as depicted in FIGS. 1-9. In this embodiment, the base of the cage 28" may, but is not required to, extend beyond the perimeter of disc springs 14".

In the embodiment depicted in FIGS. 10 and 11, two fingers 30" extend up from the base 28" of the cage 12" against the plurality of disc springs 14" within the finger channel 46". The finger channel 46" is a recess in the exterior circumferential edge 48" of the disc springs 14". In one embodiment, the finger channel 46" is a depth equal to the thickness of the fingers 30" of the cage 12". This configuration enables tightening of the nut 10" with a standard hex wrench or tool. In one embodiment, the finger channels 46" are diametrically opposed to each other. When the disc springs 14" are assembled in a stack, the finger channels 46" align. The ends 32" of the fingers 30" fold over the upper surface 18" of the outermost spring 16" to hold the disc springs 14" stationary relative to each other.

In this embodiment, the top 42" of the ends 32" of the fingers 30" are the reference point for the visual indicator 20". When the nut 10" is not fully tightened, the visual indicator 20" protrudes from the cage 12" beyond the top 42" of the fingers 30". This embodiment utilizes a visual indicator 20" that is discontinuous over the majority of the inner circumferential edge 26". FIG. 11 illustrates such a disc spring 16". When the nut 10" is tightened, the disc springs 14" flatten slightly, and the visual indicator 20" is retracted into the cage 12". When the nut 10" is fully tightened, the top 40" of the visual indicator 20" will be level with the top 42" of the ends 32" of the fingers 30".

The above description illustrates that the current invention is suitable for adaptation to various configurations of laminated nuts. For example, the reference point chosen to compare the visible indicator 20 against can be any point on the cage 12 or any other part of the nut 10 that does not move relative to the disc springs 14 when the disc springs 14 flatten as the nut 10 tightens. Similarly, the visual indicator 20 can be located on alternative locations of the upper surface 18 of the outermost disc spring 16 or on the exterior circumferential edge 48 of one of the disc springs 14. The visual indicator 20 can be of any geometry and height and can be made more visible by any type of marking.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A laminated nut comprising:
   a plurality of conical discs, said discs each defining a threaded central bore, said discs stacked on top of one another vertically with central bores in alignment;
   a cage, said cage receives said plurality of conical discs and holds said discs stationary relative to one another; and
   a visual indicator projecting from one of said conical discs, said visual indicator aligning with a reference point on the nut when the nut is fully tightened, said visual indicator being configured such that said visual indicator protrudes beyond an outer surface of said cage when the nut is not properly tightened, and such that said visual indicator does not protrude beyond said outer surface of said cage when the nut is properly tightened.

2. The laminated nut of claim 1 wherein:
   said cage includes a base, said plurality of conical discs rests on said base; and
   said plurality of conical discs include an outermost disc, said visual indicator projecting from said outermost disc.

3. The laminated nut of claim 2 wherein said outermost disc has an outer surface, said outer surface being the surface of said outermost disc that faces away from said base of said cage, said visual indicator projecting from said outer surface of said outermost disc.

4. The laminated nut of claim 3 wherein said outermost disk further defines an inner circumferential edge encircling said central bore, said visual indicator occupying some portion of said inner circumferential edge.

5. The laminated nut of claim 4 wherein said visual indicator extends axially from said outer surface of said outermost disc.

6. The laminated nut of claim 5 wherein said plurality of conical discs and said outermost disc have an exterior circumferential edge, said exterior circumferential edge having a hexagonal geometry.

7. The laminated nut of claim 6 wherein said visual indicator forms an annular ridge around an entirety of said inner circumferential edge.

8. The laminated nut of claim 6 wherein said visual indicator forms a discontinuous ridge around said inner circumferential edge.

9. The laminated nut of claim 6 wherein said cage has a plurality of fingers, said fingers extending from said base of said cage, said fingers embracing said plurality of conical discs.

10. The laminated nut of claim 9 wherein said fingers have ends extending therefrom, said ends extending over said outer surface of said outermost disc from said exterior circumferential edge, said ends of said fingers having an outer surface, said visual indicator aligning with said outer surface of said fingers when the nut is fully tightened.

11. The laminated nut of claim 9 wherein said plurality of conical discs further define a plurality of finger channels on said exterior circumferential edge.

12. The laminated nut of claim 5 wherein said cage is of a unitary tube construction and includes side walls and tabs, said side walls extend vertically from said base of said cage, and said tabs extend from said sidewalls above said outer surface of said outermost disc, said visual indicator being aligned with said tabs when the nut is fully tightened.

13. A laminated nut comprising:
   a plurality of disc springs, each of said plurality of disc springs being conical in shape and manufactured from an elastically deformable material, said plurality of disc springs each defining a threaded central bore, said plurality of disc springs stacked in vertical alignment;
   an outermost disc spring, conical in shape, manufactured from an elastically deformable material, defining a threaded central bore with a surrounding interior circumferential edge, having an outer surface with a visual indicator extending therefrom, resting above said plurality of disc springs with said outer surface facing out; and
   a cage having a base, said cage receives and surrounds the stack of said plurality of disc springs and said outermost disc spring, said outer surface of said outermost disc spring facing away from said base of said cage, said visual indicator protruding beyond an outer surface of said cage when the nut is not fully tightened, said outermost disc spring and said plurality of disc springs flattened slightly when the nut is fully tightened, said visual indicator not protruding beyond said outer surface of said case when the nut is fully tightened.

14. The laminated nut of claim 13 wherein said outermost disc spring and said plurality of disc springs each have an exterior circumferential edge hexagonal in shape.

15. The laminated nut of claim 14 wherein said visual indicator is colored in a contrasting manner.

16. The laminated nut of claim 15 wherein said visual indicator is colored white.

17. The laminated nut of claim 16 wherein said visual indicator extends axially around some portion of the inner circumferential edge.

18. The laminated nut of claim 13 wherein said visual indicator is segmented over said inner circumferential edge.

19. A laminated nut comprising:

a plurality of stacked disc springs, each of said plurality of disc springs being conical in shape and manufactured from an elastically deformable material, each of said plurality of disc springs defining a threaded central bore, each of said plurality of disc springs having an exterior circumferential edge hexagonal in geometry;

said plurality of disc springs including an outermost disc spring, said outermost disc spring being conical in shape and being manufactured from an elastically deformable material, said outermost disc spring defining a threaded central bore having an interior circumferential edge, said outermost disc including an outer surface with a visual indicator extending axially therefrom over at least a portion of said interior circumferential edge, said outermost disc spring disposed with said outer surface facing outwardly away said plurality of disc springs; and a cage having a base and an outer surface facing away from said base, said cage receiving and surrounding said plurality of disc springs, said disc springs being stacked within said cage, said cage defining an indicator opening, said outermost disc spring disposed with said visual indicator extending away from said base of said cage, said visual indicator being movably disposed within said indicator opening of said outer surface of said cage, said visual indicator protruding beyond said outer surface of said cage when the nut is not properly tightened, said visual indicator not protruding beyond said outer surface of said cage when the nut is properly tightened.

* * * * *